United States Patent [19]
Black

[11] 4,327,965
[45] May 4, 1982

[54] SINGLE MODE FIBRE AND METHOD OF MANUFACTURE

[75] Inventor: Philip W. Black, Bishop's Stortford, England

[73] Assignee: International Standard Electric Corporation, New York, N.Y.

[21] Appl. No.: 192,391

[22] Filed: Sep. 30, 1980

[30] Foreign Application Priority Data

Oct. 29, 1979 [GB] United Kingdom ............... 37401/79

[51] Int. Cl.³ .................... C03B 37/075; G02B 5/172
[52] U.S. Cl. ................................. 350/96.33; 65/3.12; 350/96.34; 427/163
[58] Field of Search ............... 65/3.12; 427/163; 350/96.33, 96.34

[56] References Cited

U.S. PATENT DOCUMENTS 4,009,014 2/1977 Black et al. ........................ 65/3.12
4,230,396 10/1980 Olshansky et al. ............. 427/163 X

OTHER PUBLICATIONS

Ainslie et al., "Preparation of . . . Single-Mode Fibre", Electronics Letters, vol. 15, No. 14, Jul. 5, 1979, pp. 411–413.
Miya et al., "Ultimate Low-Loss Single-Mode Fibre . . . ", Electronics Letters, vol. 15, No. 4, Feb. 15, 1979, pp. 106–108.

*Primary Examiner*—Richard V. Fisher
*Attorney, Agent, or Firm*—John T. O'Halloran

[57] ABSTRACT

Single mode optical fibre for operation in the wavelength range 1.5 to 1.7 microns is made by first depositing an optically absorbing layer of silica doped with oxides of boron and/or phosphorus upon the bore of a silica substrate tube. The optical absorbing layer has a higher refractive index than silica, and on it is deposited a transparent optical cladding layer of matched index, and then a higher index optical core layer. The bore of the coated tube is then collapsed to form a solid cross-section optical fibre preform from which optical fibre can be drawn.

4 Claims, 3 Drawing Figures

SINGLE MODE FIBRE AND METHOD OF MANUFACTURE

FIELD OF THE INVENTION

This invention relates to the manufacture of optical fibre preforms and optical fibres. It is concerned particularly with the manufacture of single mode optical fibres capable of operation in the free-space wavelength range 1.5 to 1.7 microns, that have optical cores and optical claddings of vapour deposited doped silica.

One of the particular advantages of using silica as a material from which to manufacture optical fibres is that it can be made by vapour reaction process in a manner that permits close control of the amount of any other materials incorporated into the material with silica. This is particularly important having regard to the fact that certain impurities at concentrations of less than 1 part per million can still have marked effects upon fibre transmission loss. In one of the preferred methods of manufacture, materials to form the cladding glass and the core glass are deposited by vapour reaction upon the bore of a silica substrate tube which subsequently has its bore collapsed and is drawn into fibre. Methods of producing single mode fibre have been described for instance by T. Miya et al. in *Electronics Letters* Feb. 15, 1979, Volume 15, No. 4, pp. 106–8 and by B. J. Ainslie et al. in *Electronics Letters* July 5, 1979, Volume 15, No. 14, pp. 411–3. In both instances the material used to form the optical cladding had a composition chosen to have a refractive index matching that of the silica substrate tube onto which the cladding glass was deposited. This matching of index avoids the formation of a structure that would support cladding modes (modes guided by the interface between the cladding and the substrate) in addition to the desired single core mode. When using the process of vapour reaction to deposit core and cladding glasses on the bore of a substrate tube, it is generally desirable to use undoped silica as the material from which to construct the tube because its relatively high melting point eases the problem of trying to prevent unacceptable distortion of the tube occurring when high temperatures are involved in the deposition process. Under these circumstances any need to match the index of the optical cladding material with that of the substrate tube has the result of imposing a specific value for the refractive index of the cladding.

SUMMARY OF THE INVENTION

The present invention is concerned with structures which permit the use of an optical cladding whose index does not match that of the substrate tube, and thereby provide a greater flexibility in design having particular regard to numerical aperture and the possibility of balancing material dispersion against waveguide dispersion to give zero total dispersion.

According to the present invention there is provided a method of making an optical fibre preform wherein an optical absorption glass layer of doped silica that includes oxides of boron and/or phosphorus and has an index greater than that of silica is deposited by vapour reaction upon the bore of a silica substrate tube, wherein a transparent optical cladding glass layer of doped silica that includes germania and has a refractive index less than, equal to, or not substantially greater than that of the absorption layer is deposited by vapour reaction upon the absorption layer, wherein a transparent optical core glass layer of doped silica that includes germania and has a refractive index greater than that of the cladding layer is deposited by vapour reaction upon the cladding layer, wherein each of said vapour reactions is a reaction from which hydrogen and its compounds are excluded, and wherein the bore of the thus coated tube is collapsed to form a solid cross-section optical fibre preform, and the relative amounts and compositions of the core and cladding glasses deposited are such that single mode optical fibre is capable of being drawn from the preform that is capable of single mode operation at selected wavelengths in the free-space wavelength range of 1.5 to 1.7 microns in which substantially all of the optical power associated with the evanescent field of said single mode propagates in said cladding glass.

BRIEF DESCRIPTION OF THE DRAWINGS

There follows a description of the manufacture of a single mode fibre emobodying the invention in a preferred form. This description is prefaced with an explanation of the background to the invention. In the description and explanation reference is made to the accompanying drawings, in which.

DETAILED DESCRIPTION OF THE INVENTION

Figure 1:
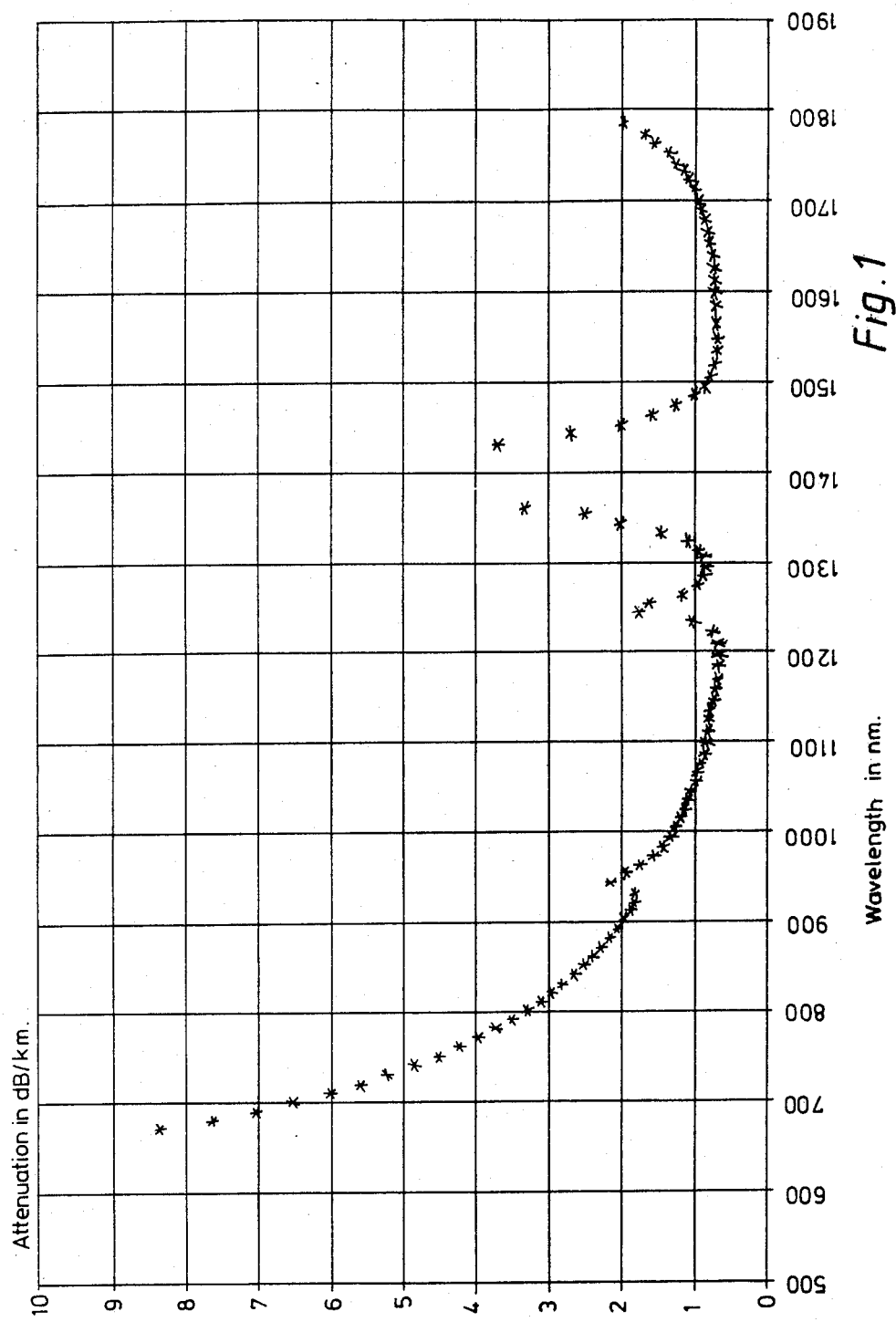
FIG. 1 is the spectral characteristic of a multimode graded index fibre.

In order to prevent the guiding of cladding modes the refractive index of the cladding layer is made equal to or less than that of the absorbing layer that surrounds it. Cladding modes will be guided if the refractive index of the cladding layer is greater than that of the absorbing layer, but, provided the index is not substantially greater, a significant proportion of the optical power of any cladding modes will propagate in the evanescent field present in the absorbing layer. Under these conditions the attenuation of cladding modes is so high that the presence of a cladding mode waveguiding structure can be tolerated. The interface between the absorption layer and the substrate similarly provides a waveguiding structure, but, in this instance also, the attenuation of the absorption layer prevents any effective propagation of unwanted modes.

One of the important factors affecting the optical transmission of fibres produced by vapour deposition upon the bore of a tube is the level of contamination by hydroxyl groups. If water is one of the reaction products of the vapour reaction used for deposition such groups may become directly incorporated into the deposited material. This source of contamination is in the present instance avoided by choosing vapour reactions from which hydrogen and its compounds are excluded. One class of suitable reactions involves the direct oxidation of halides or oxyhalides with oxygen. For this purpose the reagents may be entrained in oxygen and caused to flow down the substrate tube. The reaction does not proceed at room temperature but may be promoted in the localised region of a short high temperature zone provided, for instance, by an oxy-hydrogen flame. This zone is slowly traversed a number of times along the tube so as to build up a uniform thickness of clear glassy deposit along its length.

The material of the substrate tube is liable to be quite heavily contaminated with hydroxyl groups, and therefore the absorption layer has the additional function of serving as a diffusion barrier to limit the diffusion of hydroxyl groups from the substrate tube into the cladding and core glasses. For this purpose it is desirable to choose a glass composition for the absorption layer that can be deposited at a relatively low temperature and high deposition rate. It is found that the direct oxidation of silicon tetrachloride with oxygen proceeds at a relatively slow rate, and a relatively high deposition temperature is required to produce a clear fused deposit. However by co-depositing the silica with one or more oxides of boron, phosphorus, and germanium the deposition rate is increased, and a lower deposition temperature may be used to produce the requisite clear fused deposit.

The manufacture of doped silica by a method involving hydrogen-free deposition upon the bore of a silica substrate tube produces fibre with spectral characteristics which show a general fall in attenuation with increasing wavelength in the region from 0.7 to 1.3 microns. This fall is attributed to the effects of Rayleigh scattering. Superimposed on this general fall are a number of absorption peaks attributed to residual amounts of hydroxyl contamination. Such absorption peaks occur at 0.95, 1.25, and 1.4 microns. In the region beyond the 1.4 micron peak there is a further window which may extend to about 1.8 microns. Beyond this the attenuation begins to rise again due to different absorption phenomena associated with silica and its deliberately introduced dopants. The fundamental vibrational absorption peak of the Si—O bond is at 9.0 microns, but its absorption tail extends into the 1.0 to 2.0 micron region. The B—O, P—O, and Ge—O bonds show similar absorption peaks at respectively 7.3, 8.0 and 11.0 microns. It is found that, as a result of this these different absorption peaks associated with these bonds, the extent and depth of the windows in the region immediately beyond the 1.4 micron hydroxyl group absorption peak depends heavily upon the composition of the material in which the optical energy propagates.

Figure 2:
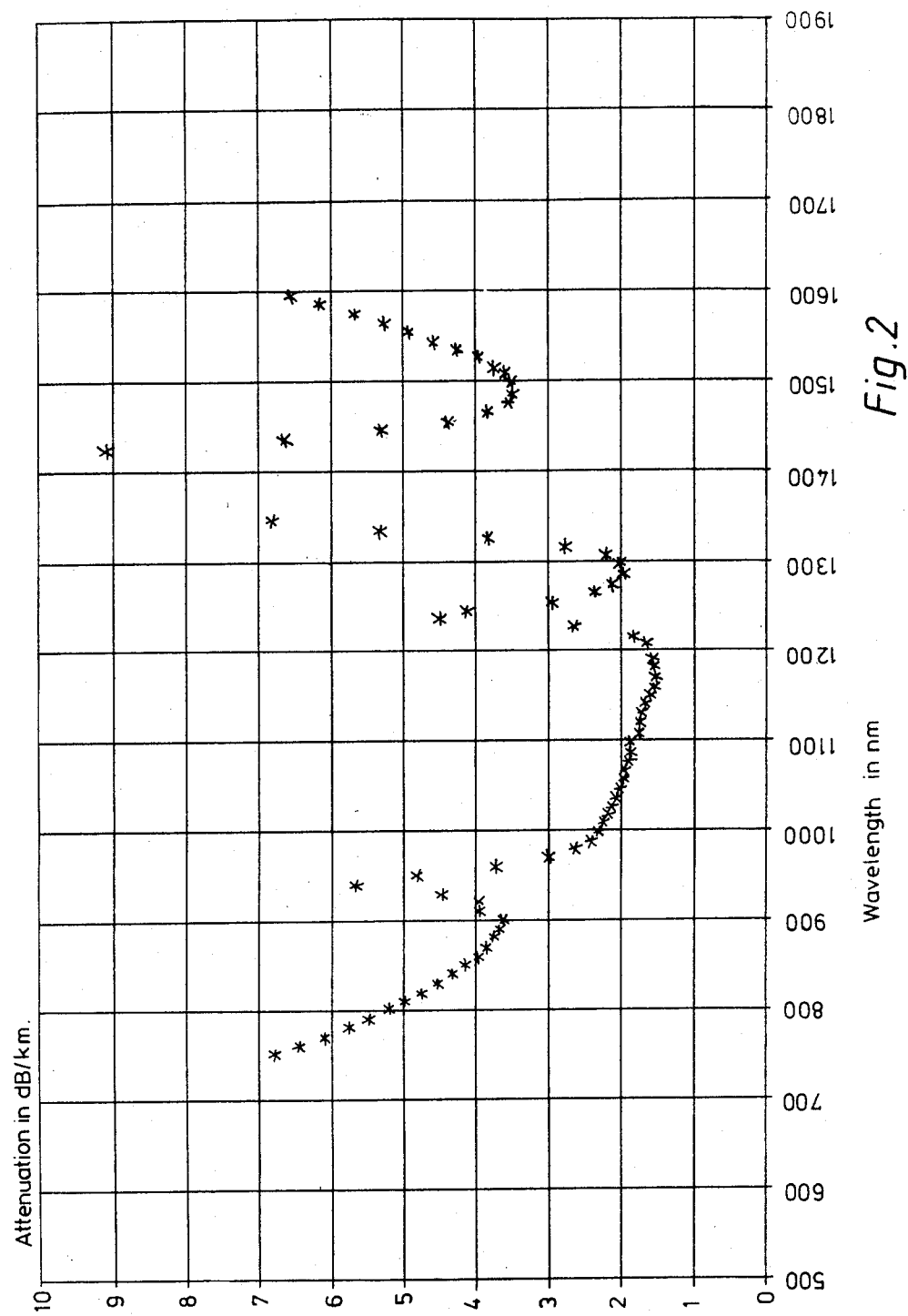
FIG. 2 is the spectral characteristic of a single mode fibre.

FIG. 1 depicts the spectral characteristic of a multimode graded index fibre having a core of silica doped mainly with germania but also including about 1 mole % oxide of phosphorus. The cladding is of silica doped with oxide of boron. FIG. 2 depicts the spectral characteristic of a single mode fibre having a germania doped silica core, and a cladding of silica doped with oxides of boron and phosphorus to provide an index matching that of undoped silica. A comparison of these two characteristics shows that the window beyond 1.4 microns of the FIG. 1 fibre is comparatively wide and deep because the optical energy propagates almost exclusively in the material of the core, whereas the corresponding window of the FIG. 2 fibre is shallower and narrower because a significant proportion of the optical energy propagates in the cladding where it suffers from the absorption tails of the B—O and P—O bonds. This attribute of doping with oxides of phosphorus and boron, which is seen to be a disadvantage in the fibre of FIG. 2, may however be used to advantage in the provision of the absorption layer of fibres constructed according to the present invention.

Figure 3:
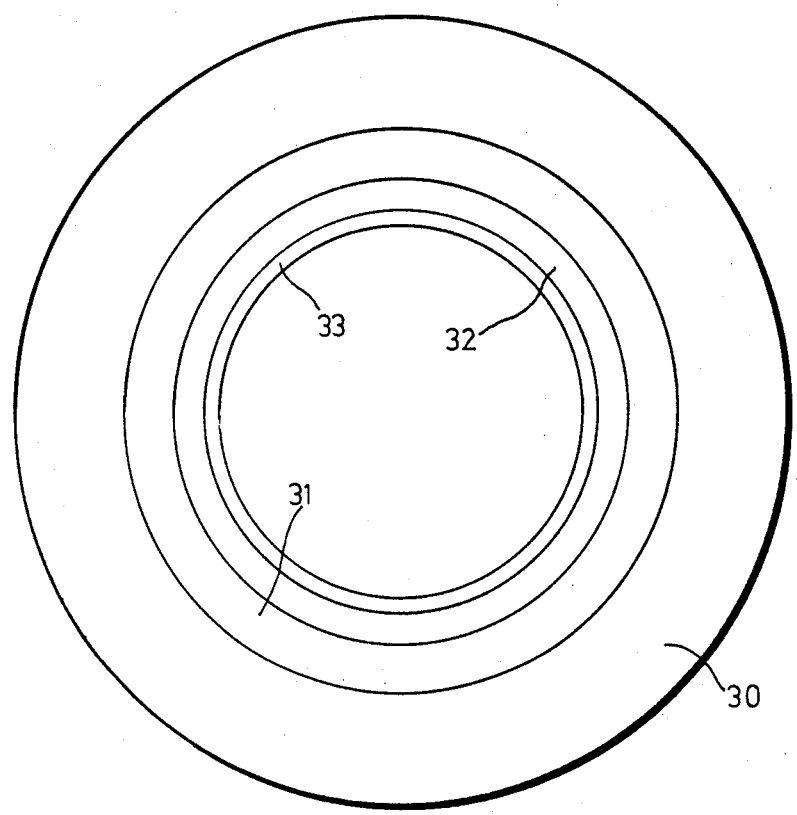
FIG. 3 depicts a schematic cross-section of an internally coated substrate tube prior to collapse of its bore to form a preform from which optical fibre can be drawn.

According to one preferred example of the invention, a 14 by 12 mm diameter silica tube 30 (FIG. 3) approximately one meter long is carefully cleaned, dried, and mounted in a special lathe having synchronously driven head- and tail-stocks. Oxygen is passed down the tube which is rotated while an oxy-hydrogen flame is slowly traversed along its length. This ensures that the tube has clean dry flame-polished bore ready to receive a layer 31 of glass which will form the optical absorption layer in the completed fibre.

This layer 31 is formed of silica doped by co-deposition with oxides of phosphorus and boron. Oxide of boron is included at a concentration of about 10 mole % because its absorption tail reaches further into the spectral region of interest than that of the oxide of phosphorus. Oxide of phosphorus is included at a concentration typically lying in the range 10 to 15 mole % to provide a further contribution to the requisite absorption and to raise the refractive index of the deposit above that of undoped silica. In determining the proportions of dopants to be employed it is necessary to take account of the way they affect the properties of the deposit. Both these dopants reduce the viscosity of the deposit and increase its expansion coefficient. If too pronounced, the former effect can give rise to problems when later collapsing the bore of the coated tube in a manner to retain circular symmetry, while the latter effect can give rise to problems of stress cracking. The reagents for forming layer 31 are oxygen gas and silicon tetrachloride, boron tri-bromide, and phosphorus oxychloride vapours. The vapours are transported in oxygen as a carrier gas by bubbling separate streams of oxygen through the three liquids. These are then mixed with a further stream of oxygen which acts as a diluent. The reaction between the vapours and oxygen does not occur spontaneously at room temperature, but is promoted by the action of the heat of the oxy-hydrogen flame which continues to be traversed along the tube. In this way a number of traverses are used to build up a layer of adequate thickness. The temperature of the flame and the rate of its traversal are carefully controlled to provide just enough heat to ensure that the deposit is formed as a clear coherent glassy layer.

Next the composition and proportion of the reagents are changed in order to deposit a layer 32 which is to form the material of the optical cladding of the completed fibre. This layer 32 is a layer of silica doped primarily with germania. Typically it contains about 1 to 2 mole % germania, and generally it includes not more than about 1 mole % oxide of phosphorus, but no oxide of boron. The small amount of oxide of phosphorus, typically about 0.2 mole %, is retained because at this concentration its absorption is not a serious disadvantage, whereas its presence is useful in lowering the temperature at which the layer can be deposited in a clear glassy form. Too high a deposition temperature is to be deprecated because this leads to problems of distortion of the substrate tube during the deposition process.

After deposition of the layer 32, which proceeds in the same way as the deposition of layer 31, the composition of the reagents is again changed for the deposition of layer 33. This is the layer whose material is to form the optical core of the completed fibre, and contains a higher proportion of germania doping in order to provide the requisite increase in refractive index over that of layer 32. Typically the composition of the core layer 33 has about 4 mole % more germania than is present in the cladding layer 32, but the same concentration of oxide of phosphorus.

Next the bore of the coated tube is collapsed to form a solid cross-section optical fibre preform. This is brought about using a higher temperature flame to soften the wall of the tube so that it collapses under the effects of surface tension. Several traverses of the flame are employed to bring about complete collapse of the bore, and during the initial stages of this collapse it is preferred to maintain a flow of germanium tetrachloride and oxygen through the tube partly to replenish dopant lost by volatilisation and partly to provide a slight excess pressure within the bore in order to ensure circular symmetry is maintained during the collapse process. The manner in which this collapse is preferably performed is described in greater detail in U.S. Pat. No. 4,165,224 (J. Irven - A. P. Harrison 12-2).

The resulting preform is suitable for storage until such time as fibre is required. It is then mounted vertically in a pulling tower and lowered through a furnace at a controlled rate while fibre is drawn from its heat softened lower end. Preferably the resulting fibre is directly passed through a coating bath to provide it with a plastics protective coating that protects its freshly drawn surface from atmospheric attack and from direct contact with anything else which is liable to damage the surface.

In a typical example the thickness of the layers deposited upon the tube 30 are chosen to provide an optical core diameter of 6.5 microns, an optical cladding diameter of 45 microns, an absorption layer diameter of 65 microns, and an overall diameter, exclusive of protective coating, of 125 microns.

I claim:

1. A method of making an optical fibre preform wherein an optical absorption glass layer of doped silica that includes oxides of boron and phosphorus and has an index greater than that of silica is deposited by vapour reaction upon the bore of a silica substrate tube, wherein a transparent optical cladding glass layer of doped silica that includes germania and has a refractive index less than, equal to, or not substantially greater than that of the absorption layer is deposited by vapour reaction upon the absorption layer, wherein a transparent optical core glass layer of doped silica that includes germania and has a refractive index greater than that of the cladding layer is deposited by vapour reaction upon the cladding layer, wherein each of said vapour reactions is a reaction from which hydrogen and its compounds are excluded, and wherein the bore of the thus coated tube is collapsed to form a solid cross-section optical fibre preform, and the relative amounts compositions of the core and cladding glasses deposited are such that single mode optical fibre is capable of being drawn from the preform that is capable of single mode operation at selected wavelengths in the free-space wavelength range of 1.5 to 1.7 microns in which substantially all of the optical power associated with the evanescent field of said single mode propagates in said cladding glass.

2. An optical fibre preform made by the method claimed in claim 1 wherein the absorption layer consists of silica doped essentially exclusively with oxides of boron and phosphorus.

3. An optical fibre preform made by the method claimed in claim 1.

4. An optical fibre drawn from a preform as claimed in claim 3.

* * * * *